(12) United States Patent  
Mance et al.

(10) Patent No.: US 7,579,116 B2
(45) Date of Patent: Aug. 25, 2009

(54) FLUORIDE ION SCAVENGER FOR FUEL CELL COMPONENTS

(75) Inventors: Andrew M. Mance, Royal Oak, MI (US); Belabbes Merzougui, Warren, MI (US); Ion C. Halalay, Grosse Pointe, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 753 days.

(21) Appl. No.: 11/097,457

(22) Filed: Apr. 1, 2005

(65) Prior Publication Data

US 2006/0222921 A1    Oct. 5, 2006

(51) Int. Cl.
H01M 6/18 (2006.01)
H01M 6/04 (2006.01)
H01M 6/16 (2006.01)
H01M 4/58 (2006.01)
H01M 8/08 (2006.01)

(52) U.S. Cl. ............... 429/315; 429/314; 429/328; 429/188; 429/218.1; 429/46

(58) Field of Classification Search ............. 429/315, 429/314, 328, 188, 218.1, 46
See application file for complete search history.

(56) References Cited

U.S. PATENT DOCUMENTS 4,445,985 A * 5/1984 Korach ............. 205/433
4,475,994 A * 10/1984 Gagne et al. .......... 205/635
2003/0232232 A1 12/2003 Hatano
2006/0046120 A1* 3/2006 Merzougui et al. ........ 429/30

FOREIGN PATENT DOCUMENTS

| JP | 11-329062 A | | 11/1999 |
| JP | 2001-223015 | * | 8/2001 |
| JP | 2002-343132 | * | 11/2002 |
| JP | 2004227844 A | | 8/2004 |
| JP | 2004-349037 | * | 12/2004 |

OTHER PUBLICATIONS

General Motors Corporation Co-Pending U.S. Appl. No. 10/929,190, filed Aug. 30, 2004, "Constituents and Methods for Protecting Fuel Cell Components, Including PEM'S".
General Motors Corporation, Co-Pending US Patent Application, "Metal Cations Chelators for Fuel Cells".

* cited by examiner

Primary Examiner—Patrick Ryan
Assistant Examiner—Helen O Chu
(74) Attorney, Agent, or Firm—Reising Ethington P.C.

(57) ABSTRACT

A fuel cell having a polymer electrolyte membrane containing fluorine atoms distributed along the polymer chains, and metal conductors and/or catalysts, is protected from fluoride ion degradation of the metal components by a fluoride ion sequestering agent fixed in the cell or flowing through the cell. In a preferred embodiment, the fluoride ion scavenger comprises a suitable number of azacrown moieties attached to polymer constituents in the electrolyte membrane or in electrodes.

2 Claims, 4 Drawing Sheets

FLUORIDE ION SCAVENGER FOR FUEL CELL COMPONENTS

TECHNICAL FIELD

The present invention relates to fuel cells, membrane electrode assemblies (MEAs) and proton exchange membranes, also known as polymer electrolyte membranes (PEMs). More specifically this invention relates to fuel cells with fluorine-containing polymer electrolyte membranes and to the scavenging of fluoride anions released from such membranes.

BACKGROUND OF THE INVENTION

Fuel cells are electrochemical cells that are being developed for motive and stationary electric power generation. One fuel cell design uses a solid polymer electrolyte (SPE) membrane or proton exchange membrane (PEM), to provide ion transport between the anode and cathode. Gaseous and liquid fuels capable of providing protons are used. Examples include hydrogen and methanol, with hydrogen being favored. Hydrogen is supplied to the fuel cell's anode. Oxygen (as air) is the cell oxidant and is supplied to the cell's cathode. The electrodes are formed of porous conductive materials, such as woven graphite, graphitized sheets, or carbon paper to enable the fuel to disperse over the surface of the membrane facing the fuel supply electrode. Each electrode carries finely divided catalyst particles to promote ionization of hydrogen at the anode and of oxygen at the cathode. Protons flow from the anode through the ionically conductive polymer membrane to the cathode where they combine with oxygen ions to form water, which is discharged from the cell. Conductor plates carry away the electrons formed at the anode. A typical fuel cell is described in U.S. Pat. No. 5,272,017 and U.S. Pat. No. 5,316,871 (Swathirajan et al).

Currently, state of the art PEM fuel cells utilize a membrane made of perfluorinated ionomers such as DuPont's Nafion®. The ionomer carries pendant ionizable groups (e.g. sulfonate groups) for transport of protons through the membrane from the anode to the cathode. But unwanted oxidation reactions occurring within the cell release fluoride anions from the polymer membrane. And the fluoride anions promote corrosion of metal conductor plates and catalyst particles. Such degradation interferes with the function of the membrane and shortens the working life of the fuel cell.

SUMMARY OF THE INVENTION

In accordance with the invention a fuel cell is modified to contain a sequestering agent to catch and hold fluoride anions generated within the cell to limit or retard fluoride ion reaction with metal surfaces in the cell. An example of a suitable group of sequestering agents is the aza-crown compounds.

Crown ethers in which all or most of the oxygen atoms have been replaced with nitrogen atoms are known as aza-crowns. An example of a suitable aza-crown is 1,4,7,10-cycloazadodecane. Like crown ethers, the molecules of aza-crowns are ring-like structures but with nitrogen atoms positioned about the interior of the ring. In an acid environment these nitrogen atoms are protonated and form what amounts to a crown of ammonium ions. This cluster of positively charged ions binds tightly to halide ions, like fluoride anions, and will sequester them from the fuel cell electrolyte. This will cause a decrease in the concentration of free fluoride ions, which in turn will decrease the rate of corrosion of base metal conductor plates or catalyst metals.

Aza-crowns are generally soluble in water. Therefore, to be useful as halide ion scavengers in fuel cells, an aza-crown moiety is preferably incorporated into the ionomer, either within its polymeric backbone, or as grafted side chains. This is suitably accomplished by modification of aza-crown molecules by attachment of a chemical side-group that enters into the polymer backbone or attaches along the polymer chain. Alternatively, the ion scavenger may be anchored to another polymer or water insoluble constituent in or near the membrane-electrodes assembly. Thus anchored, the pendant aza-crown moieties will sequester fluoride ions that have been released from the electrolyte membrane into the aqueous environment and limit their availability for promoting internal cell corrosion. The anchored aza-crown moieties thus remain available throughout the lifetime of the fuel cell.

In another embodiment of the invention, the aza-crown may be periodically injected into the cell in slightly soluble molecular form and gradually removed from the cell with the water by-product of cell operation.

The fluoride scavenger of this invention may be used in combination with other scavenging species for unwanted ions or radicals in the cell.

Other objects and advantages of the invention will become apparent from a description of preferred embodiments that follows.

DESCRIPTION OF PREFERRED EMBODIMENTS

The following description of the preferred embodiment(s) is merely exemplary in nature and is in no way intended to limit the invention, its application, or uses.

Figure 1:
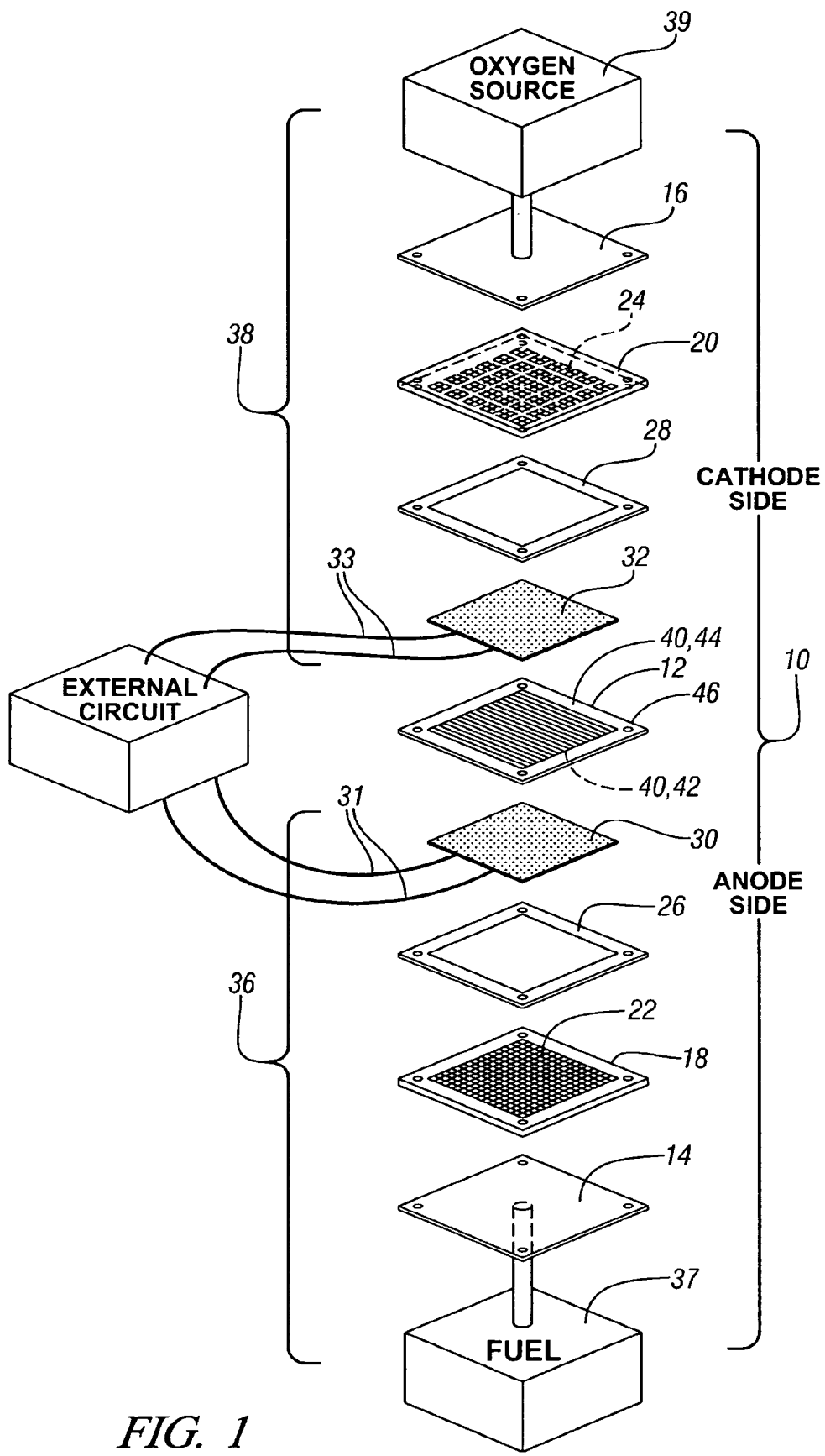
FIG. 1 is a schematic view of an unassembled electrochemical fuel cell having a membrane electrode assembly (MEA) according to the invention.

The invention is directed to forming electrodes and membrane electrode assemblies (MEAs) for use in fuel cells. Before describing the invention in detail, it is useful to understand the basic elements of an exemplary fuel cell and the components of the MEA. Referring to FIG. 1, an electrochemical cell 10 with a combination membrane electrolyte and electrode assembly 12 incorporated therein is shown in pictorial unassembled form. Electrochemical cell 10 is constructed as a fuel cell. However, the invention described herein is applicable to electrochemical cells generally. Electrochemical cell 10 comprises stainless steel endplates 14, 16, graphite blocks 18, 20 with openings 22, 24 to facilitate gas distribution, gaskets 26, 28, carbon cloth current collectors 30, 32 with respective connections 31, 33 and the membrane electrolyte and electrode assembly 12. The two sets of graphite blocks, gaskets, and current collectors, namely 18, 26, 30 and 20, 28, 32 are each referred to as respective gas and current transport means 36, 38. Anode connection 31 and cathode connection 33 are used to interconnect with an external circuit, which may include other fuel cell elements in electrical parallel or series connection.

Electrochemical fuel cell 10 includes gaseous reactants, one of which is a fuel supplied from fuel source 37, and another is an oxidizer supplied from source 39. The gases from sources 37, 39 diffuse through respective gas and current transport means 36 and 38 to opposite sides of the MEA 12. Respectively, 36 and 38 are also referred to as electrically conductive gas distribution media.

Figure 2:
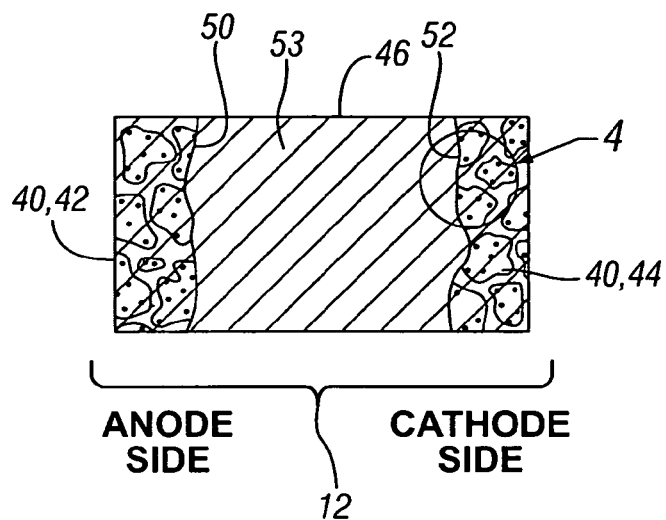
FIG. 2 is a pictorial illustration of a cross-section of an MEA according to the invention.

FIG. 2 shows a schematic view of the assembly 12 according to the present invention. Referring to FIG. 2, porous electrodes 40 form anode 42 at the fuel side and cathode 44 at the oxygen side. Anode 42 is separated from cathode 44 by a solid polymer electrolytic (SPE) membrane 46. SPE membrane 46 provides for ion transport to facilitate reactions in the fuel cell 10. The electrodes of the invention provide proton transfer by intimate contact between the electrode and the ionomer membrane to provide essentially continuous polymeric contact for such proton transfer. Accordingly, the MEA 12 of cell 10 has membrane 46 with spaced apart first and second opposed surfaces 50, 52, a thickness or an intermediate membrane region 53 between surfaces 50, 52. Respective electrodes 40, namely anode 42 and cathode 44 are well adhered to membrane 46, at a corresponding one of the surfaces 50, 52.

Figure 3:
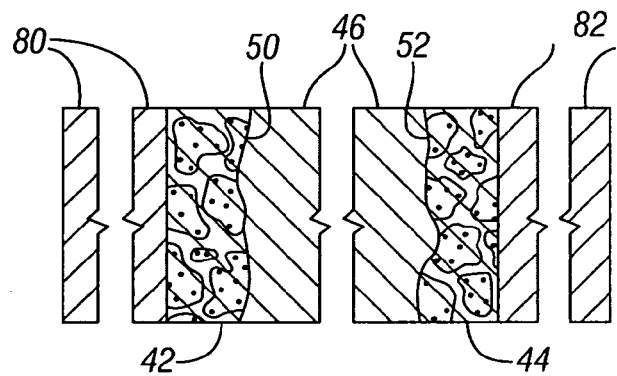
FIG. 3 is a pictorial illustration of an MEA as in FIG. 2, and having graphite sheets.

In one embodiment, respective electrodes 40 (anode 42, cathode 44) further comprise respective first and second Teflon® coated (polytetrafluoroethylene coated, impregnated) graphite sheets 80, 82, at respective sides of membrane 46. (FIG. 3) The anode active material is disposed between the first surface 50 of the membrane and the first sheet 80; the cathode active material is disposed between the second surface 52 and the second sheet 82. Each Teflon® coated sheet 80, 82 is about 7.5 to 13 mils thick.

Figure 4:
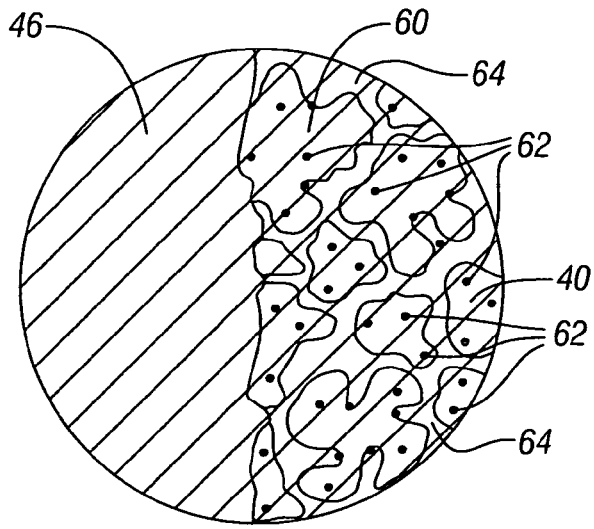
FIG. 4 is a pictorial illustration showing a magnified view of a portion of the cathode side of FIG. 2.

As shown in FIG. 4, each of the electrodes 40 are formed of a corresponding group of finely divided carbon particles 60 supporting very finely divided catalytic particles 62 and a proton conductive material 64 intermingled with the particles. It should be noted that the carbon particles 60 forming the anode 42 may differ from the carbon particles 60 forming the cathode 44. In addition, the catalyst loading at the anode 42 may differ from the catalyst loading at the cathode 44. Although the characteristics of the carbon particles and the catalyst loading may differ for anode 42 and cathode 44, the basic structure of the two electrodes 40 is otherwise generally similar, as shown in the enlarged portion of FIG. 4 taken from FIG. 2.

In order to provide a continuous path to conduct H+ ions to the catalyst 62 for reaction, the proton (cation) conductive material 64 is dispersed throughout each of the electrodes 40, is intermingled with the carbon and catalytic particles 60,62 and is disposed in a plurality of the pores defined by the catalytic particles. Accordingly, in FIG. 4, it can be seen that the proton conductive material 64 encompasses carbon and catalytic particles 60, 62.

The solid polymer electrolyte membrane (PEM) of the fuel cell is a well-known ion conductive material. Typical PEMs and MEAs are described in U.S. Pat. Nos. 6,663,994, 6,566,004, 6,524,736, 6,521,381, 6,074,692, 5,316,871, and 5,272,017, each of which is attached hereto and made a part hereof, and each of which is assigned to General Motors Corporation.

The PEM is formed from ionomers and the method of forming membranes from ionomers is well known in the art ionomers (i.e., ion exchange resins) are polymers containing ionic groups in the structures, either on the backbone or side chain. The ionic groups impart ion exchange characteristics to the ionomers and PEM.

Ionomers can be prepared either by polymerizing a mixture of ingredients, one of which contains an ionic constituent, or by attaching ionic groups onto non-ionic polymers.

One broad class of cation exchange, proton conductive resins is the so-called sulfonic acid cation exchange resins, which rely on hydrated sulfonic acid groups for conducting protons. The preferred PEMs are perfluorinated sulfonic acid types. These membranes are commercially available. For example, Nafion® the trade name used by E.I. DuPont de Nemours & Co. Others are sold by Asahi Chemical and Asahi Glass Company, etc. PEMs of this type are made from ionomers obtained by copolymerizing tetrafluoroethylene (TFE) and perfluoro vinyl ether (VE) monomer containing sulfonyl fluoride, followed by a post-treatment that converts sulfonyl fluorides into sulfonic acid groups. Examples of VE monomers are:

$CF_2=CFOCF_2CF(CF_3)OCF_2CF_2SO_2F$ and 
$CF_2=CFOCF_2CF_2SO_2F$

The components of cell 10 are prone to degradation or decomposition through attack by peroxide anions and radicals which are unwanted but inherently generated in operation of the cell 10. These oxidizing species are generated concurrently with the reduction of oxygen on the cathode side of the MEA. They may also be generated on the anode side of the MEA because of transport of oxygen through the polymer electrolyte membrane.

In view of the presence of these unwanted chemically oxidizing species, it has been proposed to provide an oxide/peroxide radical scavenging component in the fuel cell such as hydroquinone or other suitable chemical species to mitigate or consume peroxide contaminants. This approach to protection of an MEA containing fuel cell is disclosed in co-pending patent application U.S. Ser. No. 10/929,190, filed Aug. 30, 2004, by the inventors of this invention and assigned to the assignee of this invention.

In one aspect of this related disclosure, the MEA portion of the cell includes at least one constituent in ion-transfer relationship with the contaminant peroxide, where the constituent prevents, or at least inhibits, decomposition of one or more cell components by the contaminant peroxide.

For example, the PEM may comprise polymer molecules that incorporate peroxide consuming or storing functional groups. In another aspect, at least one of the first and/or second electrode(s) comprises a polymer constituent that includes peroxide consuming or storing functional groups. Such peroxide mitigating functional groups may be selected radical scavengers and substances that decompose peroxides. In a further aspect, the constituent prevents degradation of one or more other cell component(s), such as gasket, current collector sheets, Teflon® supports and the like. In yet another aspect, the constituent is an additive that is included in the cell in the form of a dispersed solid or a liquid. Examples of such additives are radical scavengers and substances that decompose peroxides.

Realistically, it is unlikely that the hydroquinones or other peroxide scavengers will capture and degrade all of the peroxides formed over the operating lifetime of a fuel cell powered vehicle. Thus, the possibility remains that some peroxide attack of fluorine containing polymers of the cell membrane or electrodes will occur with the release of fluoride anions. It remains likely that fluoride anions will migrate through the electrolyte membrane and into contact with the cathode and anode and react with and degrade metallic catalyst particles carried on these electrodes. Further, the fluoride anions will migrate into contact with metal conductor plates reacting with them to release unwanted metal ions into the cell environment and degrading the plates. The result of such fluoride ion release from cell membrane and electrode polymer structures is reduction of the performance of the cell and shortening of its useful life.

In accordance with this invention provision is made in the cell to sequester fluoride anions to mitigate damage to metallic constituents of the cell.

Crown ethers in which all or most of the oxygen atoms have been replaced with nitrogen atoms are known as azacrowns. An example of an azacrown compound is 1,4,7,10-cycloazadodecane (or 1,4,7,10 tetraaza-cyclododecane). In an acid environment these aza nitrogen atoms are protonated and form what amounts to a crown of ammonium ions. This cluster of positively charged ions binds tightly to halide ions, like fluoride, and will sequester them from the electrolyte environment. The fluoride anion, $F^-$, is well known to form strong hydrogen bonds and aza-crowns will tightly bind halides through the combination of high local positive charge and hydrogen bonding. This will cause a decrease in the concentration of free fluoride ions, which in turn will decrease the rate of metal corrosion.

The effectiveness of a representative azacrown in sequestering fluoride anions in acid solutions was demonstrated by the following experiments.

Figure 5:
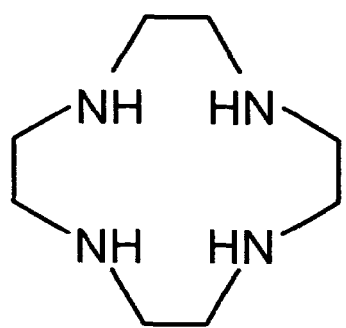
FIG. 5 illustrates the two-dimensional molecular crown structure of protonated 1,4,7,10-cycloazadodecane (CADD).

Fluoride ion concentrations were determined with an Orion fluoride selective electrode (FSE) and an Orion Model 710 conductivity/pH meter. The FSE was calibrated prior to the experiments using solutions with known concentrations of NaF. An aza-crown solution (0.25M aqueous solution of 1,4,7,10-cycloazadodecane, CADD, see FIG. 5) was protonated through the addition of an appropriate volume of 0.5M aqueous sulfuric acid. Known volumes (0.8, 1.2, 1.6, 2.6, 3.6, 4.6, 5.6, 6.6, 7.6, 8.6 and 9.6 mL) of the protonated aza-crown solution were then added to a 50 mL volume of a 50 mM aqueous NaF solution (ISE potential: −93.3 mV) using a Biohit Proline pipette and the corresponding FSE potentials were recorded after each addition when the potential reached a stable value. The experiment was performed under constant stirring, at a temperature of 24° C.

Figure 6:
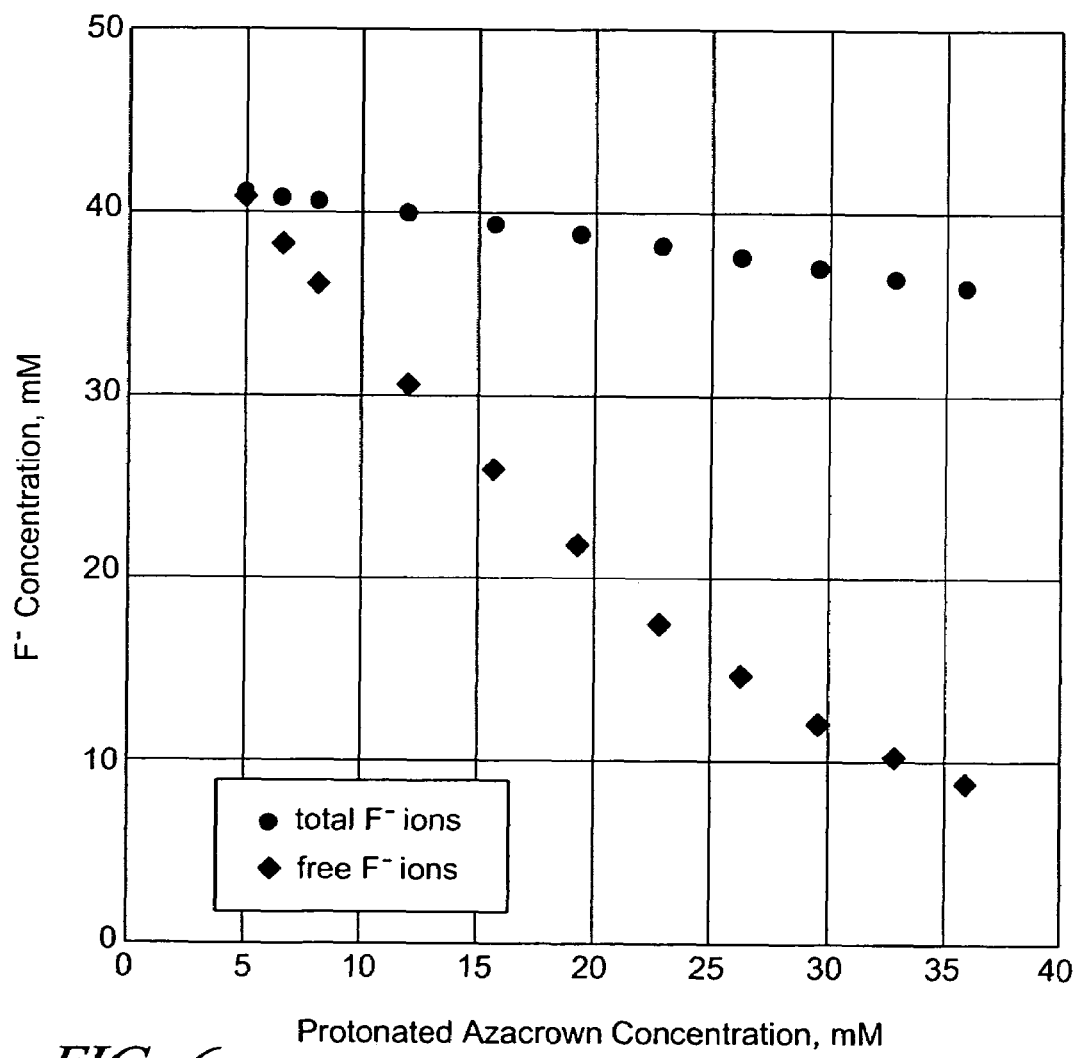
FIG. 6 is a graph of fluoride ion, $F^-$, concentration in millimoles, mM, versus protonated azacrown (CADD) concentration, mM. The filled circle data points record total $F^-$ ions in solution and the filled diamond data points record free $F^-$ ions, i.e. ions not sequestered by CADD.
Figure 7:
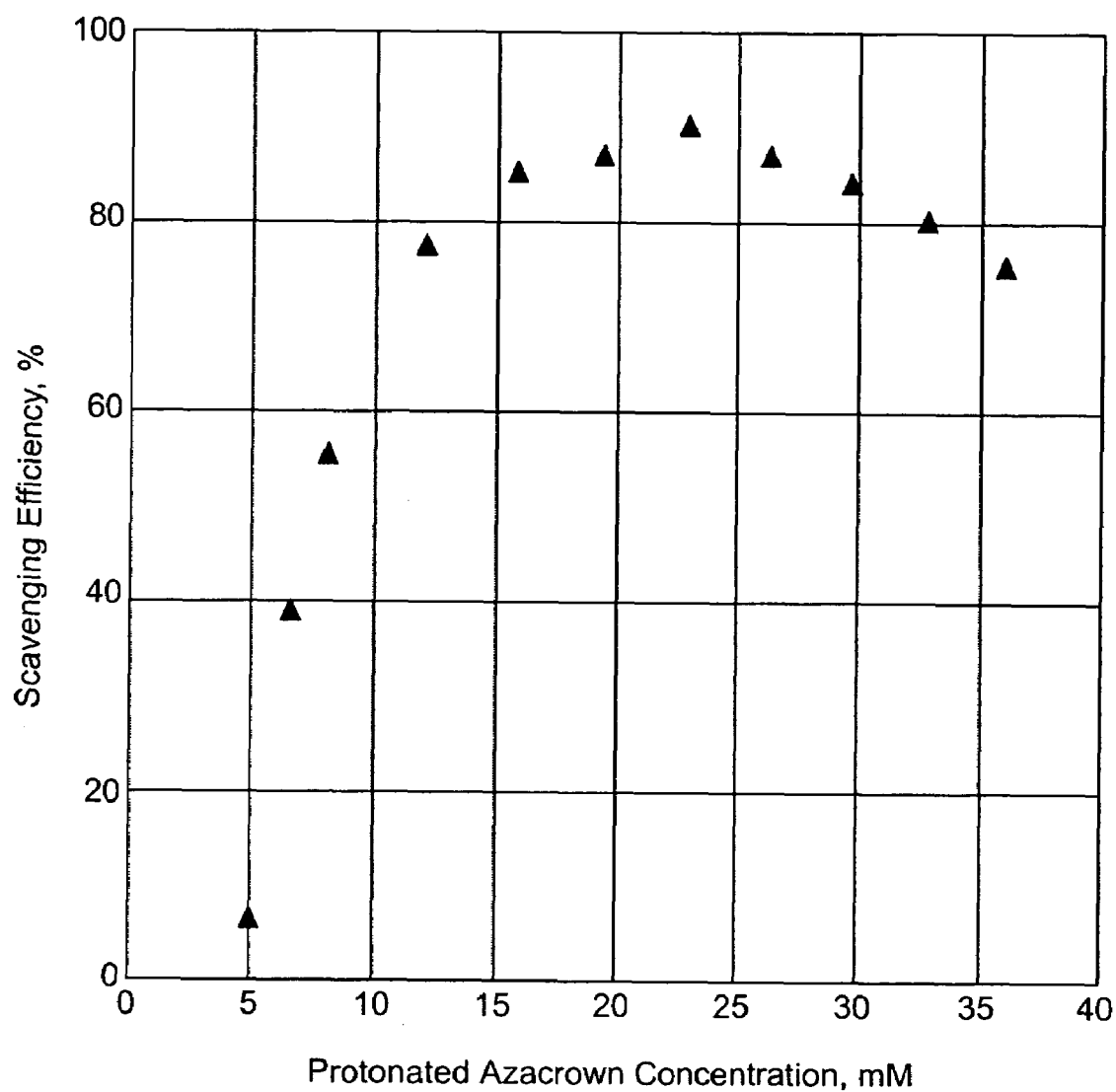
FIG. 7 is a graph of sequestering efficiency for fluoride ions of an azacrown, CADD in aqueous acid solution versus protonated azacrown concentration in mM.

FIG. 6 shows the effect of the addition of the aza-crown CADD on the activity of fluoride ions in fuel cell conditions. With increasing concentrations of the azacrown CADD more of the fluoride ions are sequestered and restrained from migration in the acid aqueous solution. FIG. 7 shows that the sequestering efficiency of the azacrown CADD reached about 90% at a concentration of about 23 mM in the acid medium.

Azacrowns are generally soluble in water. It is preferred that azacrown molecules be incorporated into the electrolyte ionomer, either within its polymeric backbone, or as part of grafted side chains or groups. Thus anchored to the polymer source of the fluoride ions, the azacrown moieties will sequester fluoride ions that have been released into the water-polymer electrolyte environment and limit their availability for promoting internal cell corrosion. The strategy is to anchor a suitable number of aza-crown moieties to some portion of the membrane or sandwiching electrode material compositions to trap the fluoride over a suitable period of operating time of the cell. Another approach is to provide for periodic addition of a suitable small amount of aza-crown to the fuel cell and allowing the crown-fluoride complex to be washed out by the wastewater.

Crown ethers and their aza-analogues constitute a substantial family of compounds. Those members having a large enough crown structure to sequester a fluoride anion may be adapted for use in the practice of this invention. In order to attach a suitable azacrown to a PEM substrate or other polymer substrate it will usually be necessary to chemically modify a peripheral portion of the crown molecule to, for example, attach a vinyl group for incorporation into the polymer chain of the PEM or attach a basic group for bonding to a pendant acid functionality. Obviously other chemical modification strategies may be exploited to attach azacrown moieties to PEM molecules or to other constituents of the electrode-electrolyte environment.

The fluoride-scavenging constituents of this invention may be used alone or in combination with scavenging chemical groups or species for other unwanted materials in the electrolytic cell. As mentioned above, it has been proposed to incorporate in the cell scavenging materials for peroxides and other strongly oxidizing species that sever fluoride ions from polymer constituents of the cell in the first instance. Obviously, fluoride scavengers can be used in combination with such destroyers or capturers of oxidizers detrimental to electrolytic cell function and life.

The practice of the invention has been illustrated by examples of certain preferred embodiments which are not intended to limit the scope of this invention.

The invention claimed is:

1. A fuel cell comprising:
an acidic polymer electrolyte membrane sandwiched between an anode and a cathode where at least one of the acidic polymer electrolyte membrane, the anode, or the cathode comprise fluorine atoms susceptible to conversion to fluoride anions in operation of the cell; and
an azacrown molecule serving as a fluoride anion sequestering agent that binds the fluoride anions in the acidic environment of the cell, in which the azacrown molecule is 1,4,7,10-cycloazadodecane.

2. A fuel cell comprising:
an acidic polymer electrolyte membrane sandwiched between an anode and a cathode where at least one of the acidic polymer electrolyte membrane, the anode, or the cathode comprise fluorine atoms, and where chemical oxidizing species are formed in operation of the cell that convert some of the fluorine atoms to fluoride anions;
a sequestering agent for chemical oxidizing species; and
an azacrown molecule serving as a fluoride anion sequestering agent that binds the fluoride anions, in which the azacrown molecule is 1,4,7,10-cycloazadodecane.

* * * * *